(12) United States Patent
Murtishaw et al.

(10) Patent No.: US 6,695,918 B2
(45) Date of Patent: Feb. 24, 2004

(54) SYSTEM FOR COATING THE NECK PORTION OF A CATHODE RAY TUBE FUNNEL

(75) Inventors: David Allen Murtishaw, Sun City, CA (US); Michael Gerald King, Poway, CA (US); David Cataldo, Poway, CA (US)

(73) Assignees: Sony Corporation, Tokyo (GP); Sony Electronics, Inc., Park Ridge, NJ (US)

( * ) Notice: Subject to any disclaimer, the term of this patent is extended or adjusted under 35 U.S.C. 154(b) by 321 days.

(21) Appl. No.: 09/896,539

(22) Filed: Jun. 29, 2001

(65) Prior Publication Data

US 2003/0003226 A1 Jan. 2, 2003

(51) Int. Cl.$^7$ .................................................. B05C 1/02
(52) U.S. Cl. ........................................ 118/264; 15/97.1
(58) Field of Search ..................... 118/264; 427/429; 401/86, 207, 261, 290; 15/97.1

(56) References Cited

U.S. PATENT DOCUMENTS

| | | | | |
|---|---|---|---|---|
| 4,468,828 A | * | 9/1984 | Nadolny et al. | 15/97.1 |
| 4,660,501 A | * | 4/1987 | Nagata et al. | 118/203 |
| 4,698,005 A | * | 10/1987 | Kikuchi et al. | 425/163 |
| 5,131,349 A | * | 7/1992 | Keller et al. | 118/73 |
| 5,702,758 A | * | 12/1997 | Hashiuchi et al. | 427/133 |
| 6,556,027 B2 | * | 4/2003 | Banks | 324/700 |

FOREIGN PATENT DOCUMENTS

WO    WO 00/10733    * 3/2000

* cited by examiner

Primary Examiner—Laura Edwards
(74) Attorney, Agent, or Firm—Steven L. Nichols

(57) ABSTRACT

An improved shaft is described with which a sponge saturated with carbon coating can be pushed through the narrow neck of a cathode ray tube funnel to fully coat the interior of the neck with the carbon coating. The improved shaft is made of a plastic composite material, for example. This improved shaft is much less expensive than previous stainless steel shafts and has enough flexibility that it is not easily bent when plunged into a funnel that is not properly aligned and centered under the shaft.

13 Claims, 5 Drawing Sheets

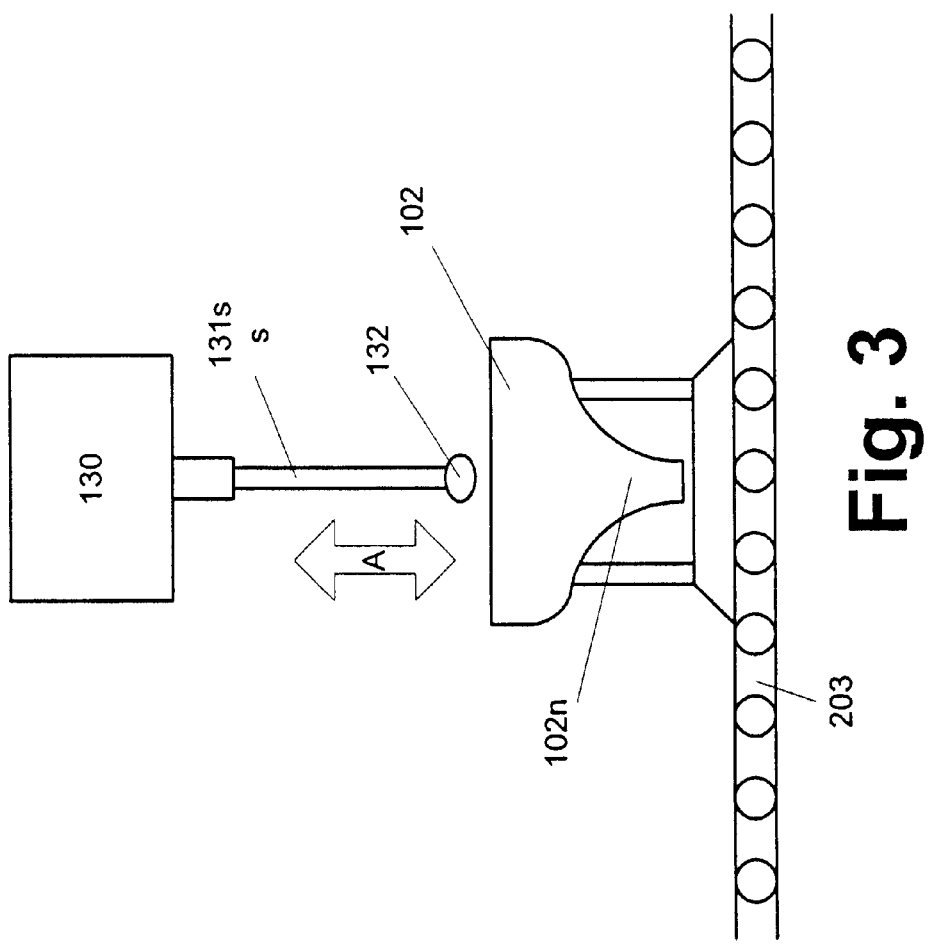

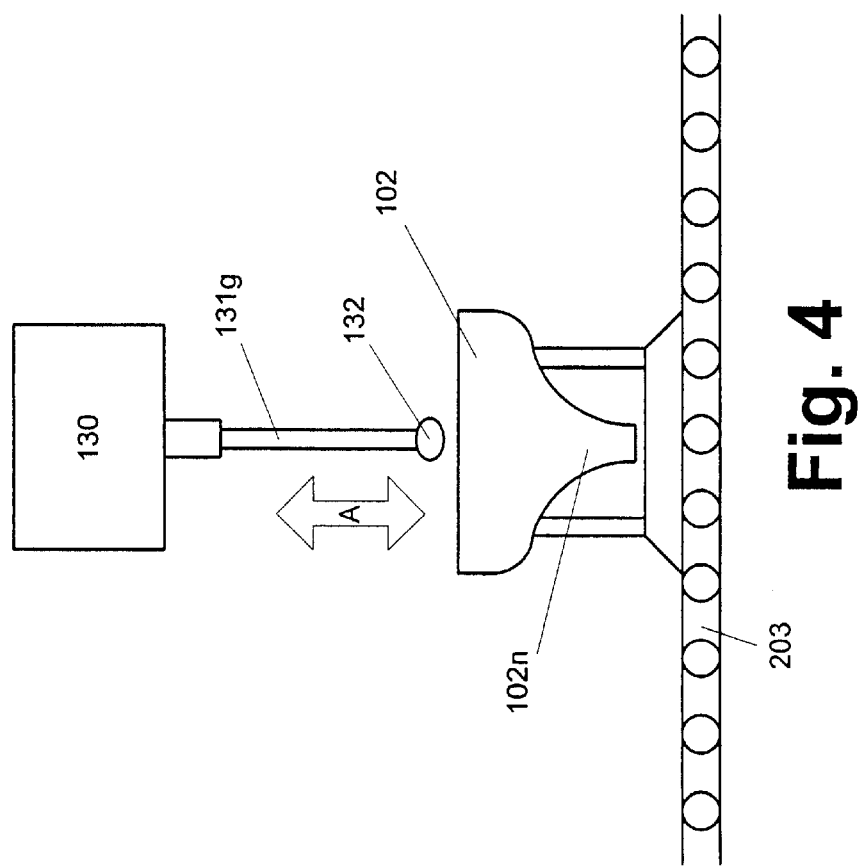

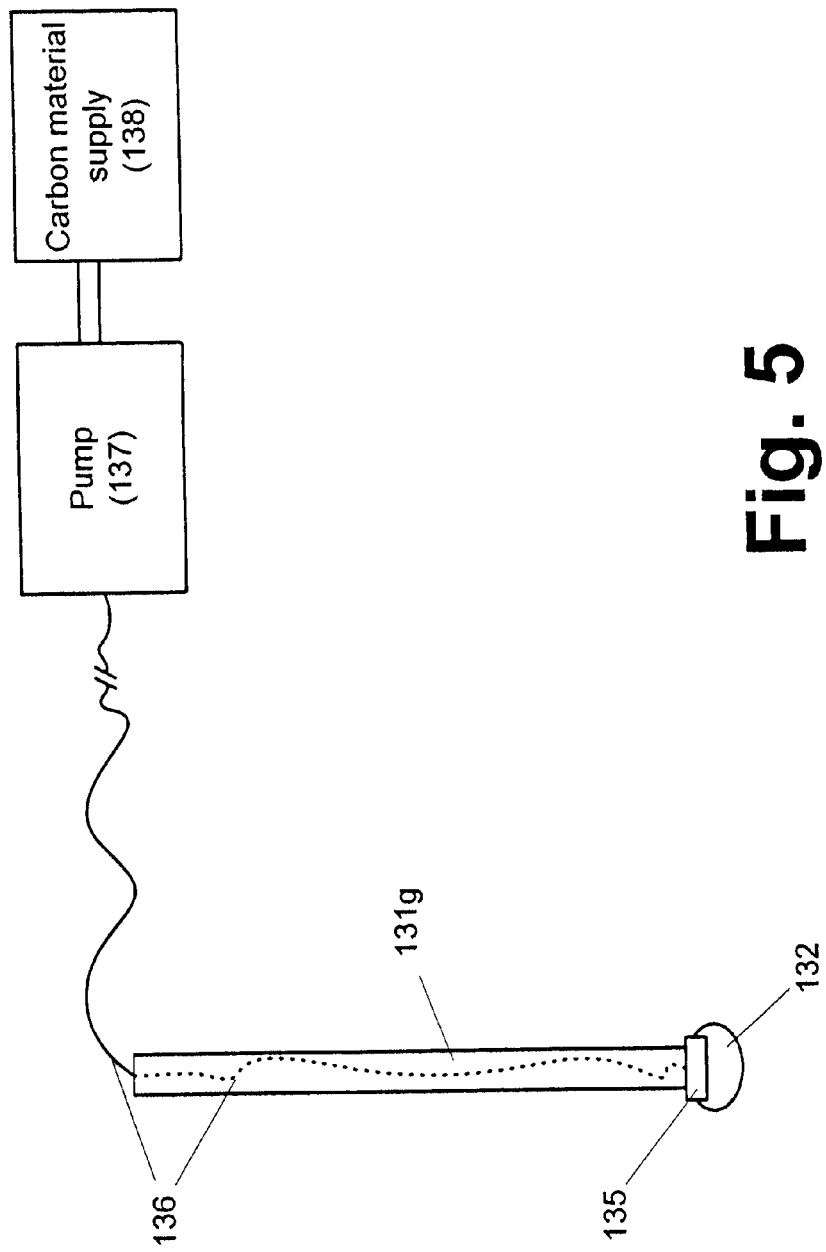

SYSTEM FOR COATING THE NECK PORTION OF A CATHODE RAY TUBE FUNNEL

FIELD OF THE INVENTION

The present invention relates to the field of cathode ray tube manufacture. More particularly, the present invention relates to the process of coating the narrow neck portion of a cathode ray tube funnel with a carbon material. Specifically, the present invention provides an improved shaft on which a sponge is supported for coating carbon material in the narrow neck portion of a cathode ray tube funnel prior to the sealing of the tube.

BACKGROUND OF THE INVENTION

Cathode ray tubes ("CRTs") are used in most television sets and computer and video monitors. A typical CRT is illustrated in FIG. 1. The CRT (100) is a glass tube with a bottle-like shape in which a relatively flat bottom portion (101) is sealed to a funnel (102). The funnel narrows into an elongated neck portion (102n). The relatively flat portion (101) of the CRT (100) becomes the screen on which the display of the television set or monitor is generated when the CRT is incorporated therein. An electro-luminescent material, such as phosphorus, that emits light when struck by an electron beam, is coated over the interior of the screen portion (101) of the CRT (100).

An electron gun (105) is then installed in the neck (102n) of the CRT (100). A stream of electrons (1070 emitted from the electron gun (105) is scanned over the electro-luminescent layer and turned on and off during the scanning to cause the electro-luminescent layer to glow in certain places and not others. In very simple terms, this is how an image is generated on the screen of a television or video monitor.

A yoke (not shown) is provided around the neck (102) of the CRT (100). This yoke produces a changing magnetic field through which the electron beam (107) from the electron gun (105) passes. The electron beam (107) is deflected by the magnetic field of the yoke. Consequently, by varying the magnetic field created by the yoke in a precise cycle, the electron beam (107) can be scanned, line-byline, over the entire surface of the screen (110) to generate video images thereon.

A cathode ray tube is generally constructed in the following matter. The funnel portion (102) of the CRT (100) is formed open at both ends. Then the relatively flat display portion (101) is sealed to the large end of the funnel (102) and the electron gun (105) is installed in the narrow end or neck (102n) of the funnel.

The display portion (101) is sealed to the funnel (102) using frit. Frit is a glass paste that can be cured or hardened. Frit (103), in paste form, is applied around the large end of the funnel (102) between the funnel (102) and the display portion (101). The frit is then cured or hardened to form a frit seal (103) between the funnel (102) and the display portion (101).

Before the funnel (102) and display (101) portions are sealed, a coating is applied to the interior of the funnel (102). This coating includes carbon material necessary to the optimal operation of the CRT (100). FIG. 2 illustrates a portion of a CRT production line in which the carbon material coating is applied to the interior of the funnel (102).

As shown in FIG. 2, cathode ray tube funnels (102) are supported during processing on holders or pallets (200). The pallets (200) include a base (201) with supports (202) that hold the funnel (102) in an upright position with the open, large end of the funnel (102) pointing upward. The pallets (200) carrying the funnels (102) may be transported on a conveyor (203).

First, each funnel (102) is brought to the coating application station (205). At the coating application station (205), the coating of carbon material is sprayed into the interior of the funnel (102). A spray head (204) sprays the coating into the open interior of the funnel (102) as the funnel (102) is supported on the pallet (200). Then, the funnel (102) is conveyed into and through a drying oven (206) to dry the newly applied coating.

In addition to this spraying process to coat the interior of the funnel (102) with carbon material, the narrow neck portion (102n) of the funnel (102) must also be fully coated with carbon material. Because of the narrow aspect of the neck (102n) below the main funnel (102), the sprayer (204) cannot be assured of fully coating the interior of the neck (102n) with carbon material.

Consequently, to complete the coating of the neck (102n) of the funnel (102), a stainless steel shaft is used that supports a sponge which is saturated with the carbon coating. The shaft and sponge are pushed through the neck of the funnel to fully coat the neck with the carbon coating. The shaft is always made of stainless steel. Presently, such a shaft costs about $190.

Unfortunately, there are several problems with this present system. First of all, as shafts are installed and replaced, shafts are periodically misplaced. This is particularly costly and unacceptable due to the relatively high expense of each shaft.

Additionally, for each week the system is operated, several shafts will be damaged and rendered unusable. The stainless steel shafts are damaged when the funnel is not precisely aligned under the robot. When the shaft is then plunged into the funnel, if the funnel and its neck are not precisely aligned with the downward path of the shaft, the shaft will be bent by insertion into the misaligned funnel.

Once the stainless steel shaft is bent, it is generally rendered unusable. However, it may be some time before the damage to the shaft is noticed. During this time, any funnels that are processed, i.e., are coated with carbon coating using the sponge on the bent shaft, may have uneven coating applied in the interior of the necks of those funnels. This is because of the bend in the damaged shaft. Such uneven coating of the neck may readily result in a CRT that is of low quality and unreliable when that unevenly coated funnel is used to construct that CRT.

Additionally, once the damage to the shaft is discovered, there is a significant amount of downtime required to remove and replace the damaged shaft. This downtime obviously decreases the efficiency and output of the production line of cathode ray tubes.

Consequently, there is a need in the art for an improved method and system of applying carbon coating in the interior of the narrow neck of a cathode ray tube funnel. Preferably, such an improved method and system should not rely on expensive and easily damaged stainless steel shafts.

SUMMARY OF THE INVENTION

The present invention meets the above-described needs and others. Specifically, the present invention provides an improved method and system of applying carbon coating in the interior of the narrow neck of a cathode ray tube funnel.

This improved system does not rely on expensive and easily damaged stainless steel shafts.

Additional advantages and novel features of the invention will be set forth in the description which follows or may be learned by those skilled in the art through reading these materials or practicing the invention. The advantages of the invention may be achieved through the means recited in the attached claims.

The present invention may be embodied and described as a system for applying a carbon coating to an interior of a neck portion of a cathode ray tube funnel. The system preferably includes a shaft made of a flexible, non-metallic material; a sponge attached to the shaft for spreading the carbon coating; and a robot for moving the shaft and the sponge through the neck portion of a cathode ray tube funnel.

The sponge is saturated with the carbon coating. Tubing may be included in the shaft for supplying the carbon coating to the sponge. A pump may also be connected to the tubing for pumping the carbon coating from a supply of such carbon coating through the tubing to the sponge.

A conveyor system may be used for automatically aligning the cathode ray tube funnels under the robot and the shaft. If the conveyor system misaligns the funnels, the flexible, non-metallic shaft will not be damaged by insertion through the misaligned funnel.

The shaft preferably includes a base for securing the sponge to the shaft. The shaft is preferably made of a composite plastic material. Most preferably, the shaft is made of Garolite.

The present invention also encompasses the methods of making and using the system and shaft described above. Specifically, the present invention encompasss a method of applying a carbon coating to an interior of a neck portion of a cathode ray tube funnel by pushing a shaft made of a flexible, non-metallic material through the neck portion of a cathode ray tube funnel, a sponge being attached to the shaft for spreading the carbon coating on the interior of the neck portion of the cathode ray tube funnel.

The method of the present invention may also include any or all of the following steps: saturating the sponge with the carbon coating; supplying the carbon coating to the sponge through tubing in the shaft; and pumping the carbon coating from a supply of such carbon coating through the tubing to the sponge. The method may also include aligning the cathode ray tube funnel under the shaft with a conveyor system.

As to the important composition of the shaft, the method of the present invention may include making the shaft of a composite plastic material. More preferably, the method of the present invention may include making the shaft of Garolite (e.g., a fiber epoxy laminate).

BRIEF DESCRIPTION OF THE DRAWINGS

The accompanying drawings illustrate preferred embodiments of the present invention and are a part of the specification. Together with the following description, the drawings demonstrate and explain the principles of the present invention.

FIG. 3 is an illustration of a proprietary system for coating the narrow neck portion of a cathode ray tube funnel with the required carbon coating.

FIG. 4 is an illustration of an improved system according to the present invention for coating the narrow neck portion of a cathode ray tube funnel with the required carbon coating.

FIG. 5 is a more detailed illustration of portions of the improved system of the present invention illustrated in FIG. 4.

Throughout the drawings, identical elements are designated by identical reference numbers.

DETAILED DESCRIPTION OF THE PREFERRED EMBODIMENTS

Figure 1:
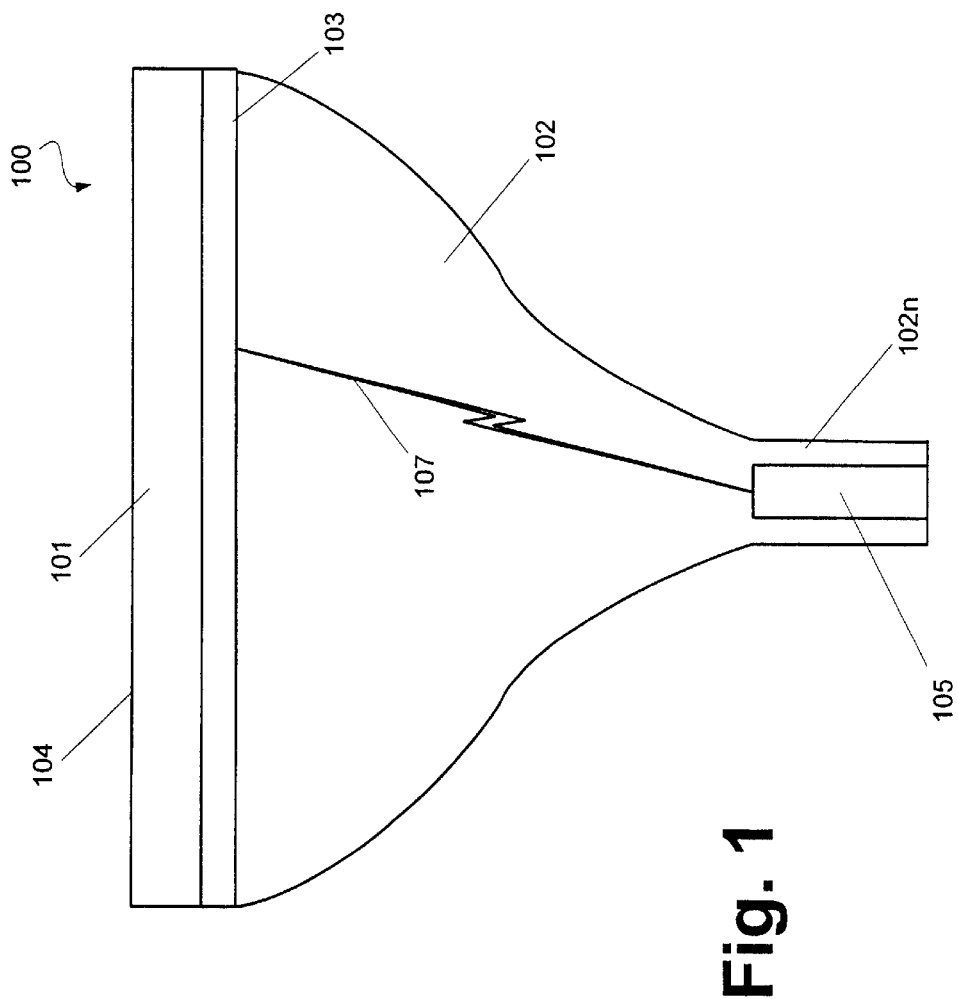
FIG. 1 is an illustration of a cathode ray tube to the manufacture of which the present invention may be profitably applied.
Figure 2:
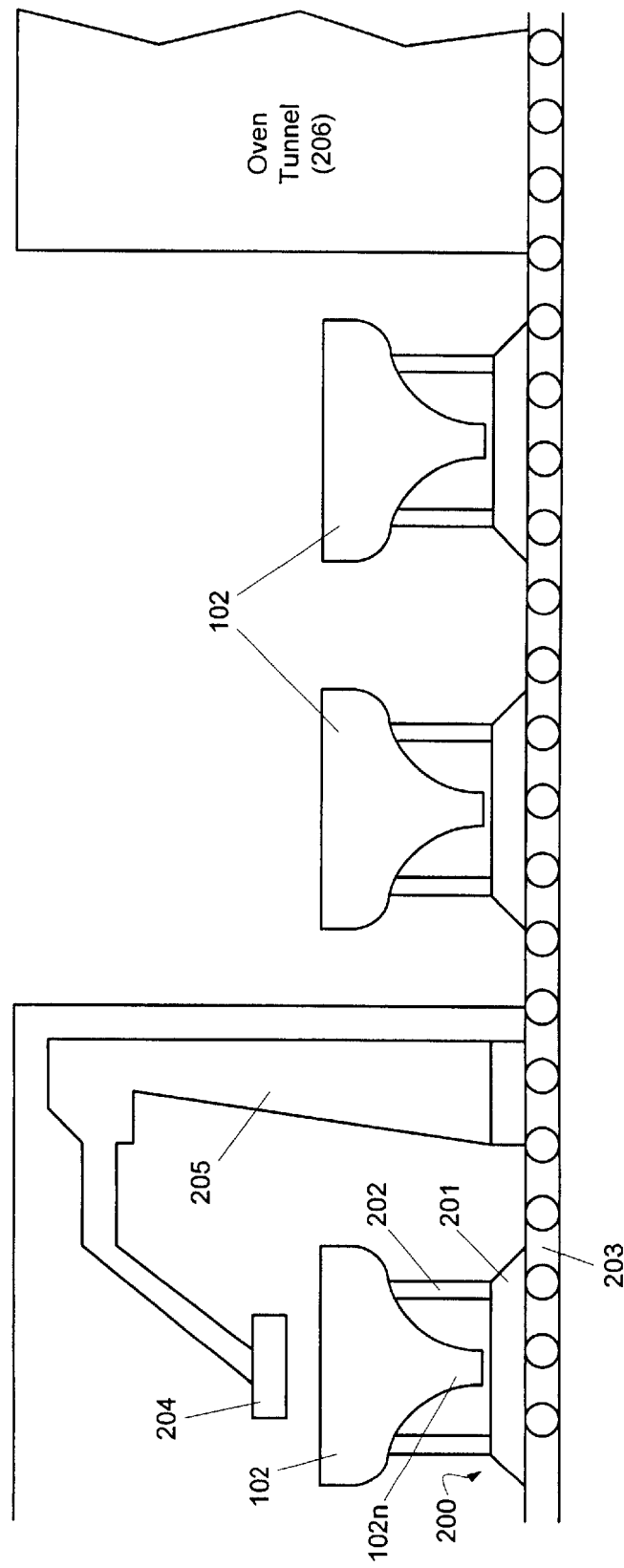
FIG. 2 is an illustration of a system for coating the interior of cathode ray tube funnels with carbon material. The present invention may be incorporated into such a cathode ray tube production line.

In broad general principle, the present invention provides a shaft with which a sponge saturated with carbon coating can be pushed through the narrow neck of a cathode ray tube funnel to fully coat the interior of the neck with the carbon coating, where the shaft is made of a plastic composite material. The preferred material for the improved shaft is Garolite (e.g., a fiber epoxy laminate). This improved shaft is much less expensive than previous stainless steel shafts and has enough flexibility that it is not easily bent when plunged into a funnel that is not properly aligned and centered under the shaft. Consequently, the improved shaft overcomes the problems in the prior art.

As described above, in addition to the spraying process to coat the interior of the funnel (102) of a cathode ray tube with carbon material, the narrow neck portion (102n) of the funnel (102) must also be fully coated with carbon material. Because of the narrow aspect of the neck (102n) below the main funnel (102), the sprayer (204) cannot be assured of fully coating the interior of the neck (102n) with carbon material. Consequently, to complete the coating of the neck (102n) of the funnel (102), a stainless steel shaft (131ss) is used that supports a sponge (132) which is saturated with the carbon coating. The shaft (131ss) and sponge (132) are pushed through the neck (102n) to fully coat the neck (102n) with the carbon coating.

FIG. 3 illustrates this method and apparatus as implemented in a proprietary system. As shown in FIG. 3, the funnel (102) is aligned underneath a robot (130). The funnel (102) is aligned under the robot (130) automatically by, for example, a conveyor system (203). As will be explained below, it is important that the funnel (102) be properly aligned and centered under the robot (130) so as to receive the shaft (131ss).

The robot (130) holds the shaft (131ss) that supports the sponge (132). The sponge (132) is attached to the lower end of the shaft (131ss) and is saturated with the carbon coating that must be applied throughout the interior of the funnel (102), including the narrow neck (102n).

Once the funnel (102) is aligned beneath the robot (130), the robot (130) will plunge the shaft (131ss) and the sponge (132) through the funnel (102) as indicated by the arrow "A." The robot (130) then retracts the shaft (131ss) and sponge (132) and may repeat the downward action if needed. As a result, the neck (102n) of the funnel (102) is fully coated with the carbon coating supplied on the sponge (132).

The shaft (131ss) is always made of stainless steel. Presently, such a shaft costs about $190. As noted above, the expense of the stainless steel shaft (131ss) and the ease with which the shaft (131ss) can be damaged create many problems with this system.

FIG. 4 illustrates an improved system according to the present invention for coating the narrow neck of a cathode ray tube funnel with carbon coating. As shown in FIG. 4, the funnel (102) is aligned underneath a robot (130). The funnel (102) is aligned under the robot (130) automatically by, for example, a conveyor system (203).

The robot (130) holds the shaft (131g) that supports the sponge (132). The sponge (132) is attached to the lower end of the shaft (131g) and is saturated with the carbon coating that must be applied throughout the interior of the funnel (102), including the narrow neck (102n).

Once the funnel (102) is aligned beneath the robot (130), the robot (130) will plunge the shaft (131g) and the sponge (132) through the funnel (102) as indicated by the arrow "A." The robot (130) then retracts the shaft (131g) and sponge (132) and may repeat the downward action if needed. As a result, the neck (102n) of the funnel (102) is fully coated with the carbon coating supplied on the sponge (132).

Unlike in the prior art, the shaft (131g) is made of a plastic or a plastic composite material. This provides the shaft with some flexibility. Consequently, if the funnel (102) is not properly aligned underneath the shaft (131g) and robot (130), the shaft (131g) can flex to accommodate the misalignment while still coating the interior of the neck (102n) with carbon coating. When the shaft (131g) is removed from the funnel (102), the shaft (131g) will spring back to its original shape and will not be permanently bent by the misaligned funnel (102). Consequently, a misaligned funnel (102) does not damage and/or ruin the shaft (131g).

The shaft (131g) will not be permanently bent by a misaligned shaft and, therefore, unevenly coat subsequent funnels (102) on which it may be used. The shaft (131g) will not be permanently bent by a misaligned shaft and, therefore, require replacement. As noted above, such replacement incurs the cost of a new shaft as well as the expense of downtime for the production line.

In a more preferred embodiment, the shaft (131g) according to the present invention is made of Garolite, a plastic composite material that is particularly suitable for constructing the shaft (131g) required. A Garolite shaft will cost about $3.00 per shaft as compared with the cost of $190 for the previously-used stainless steel shafts.

Because of the relatively low cost of the Garolite shaft (131g), misplacing a shaft during operation of the production line is not as expensive a mistake. And, replacing a shaft (131g), as will be periodically required due to expected wear and tear, is not a significant expense either.

Most importantly, because the Garolite shaft (131g) can flex to accommodate misaligned funnels (102) and is not damaged thereby, the useful life of a composite or Garolite shaft (131g) is expected to be at least twice that of a conventional stainless steel shaft.

The dimensions of the shaft (131g) will be dictated by the size of cathode ray tube funnel being processed. From this specification, one of skill in the art will be able to determine the optimal dimensions for a shaft (131g) according to the present invention.

FIG. 5 is a more detailed illustration of the shaft (131g) and cooperating system according to the present invention. As shown in FIG. 5, the shaft (131g) includes a base (135). The base (135) is used to hold the sponge (132) on the shaft (131g) and may have clips or other mechanisms for attaching the sponge (132) to the shaft (131g).

Inside the shaft (131g) is a system of micro-tubing (136). The tubing (136) is used to supply the sponge (132) with carbon coating. The tubing (136) delivers liquid carbon coating to the base (135) from which the coating is dispersed into the sponge (132). The sponge (132) should be saturated with the coating when the sponge (132) is pushed through the neck (102n) of the funnel (102) so as to evenly coat the interior of the neck (102n) with the coating.

The tubing (136) is connected to a pump (137). The pump (137) is connected to a supply of the carbon coating (138). The pump (137) draws carbon coating from the supply (138) and pumps it through the tubing (136) to the sponge (132). In this way, the sponge (132) is continuously supplied with the carbon coating that it must applied to the interior of the necks (102n) of cathode ray tube funnels (102).

The preceding description has been presented only to illustrate and describe the invention. It is not intended to be exhaustive or to limit the invention to any precise form disclosed. Many modifications and variations are possible in light of the above teaching.

The preferred embodiment was chosen and described in order to best explain the principles of the invention and its practical application. The preceding description is intended to enable others skilled in the art to best utilize the invention in various embodiments and with various modifications as are suited to the particular use contemplated. It is intended that the scope of the invention be defined by the following claims.

What is claimed is:

1. A system for applying a carbon coating to an interior of a neck portion of a cathode ray tube funnel, said system comprising:
    a shaft made of a flexible, non-metallic material;
    a sponge attached to said shaft for spreading said carbon coating;
    a robot for moving said shaft and said sponge through said neck portion of a cathode ray tube funnel; and
    a conveyor system for aligning said cathode ray tube funnel under said robot and said shaft.

2. The system of claim 1, further comprising a supply of said carbon coating associated with said sponge for supplying said sponge with said carbon coating.

3. The system of claim 2, further comprising tubing in said shaft for supplying said carbon coating to said sponge.

4. The system of claim 3, further comprising a pump for pumping said carbon coating from a supply of such carbon coating through said tubing to said sponge.

5. The system of claim 1, further comprising a base on said shaft for securing said sponge to said shaft.

6. The system of claim 1, wherein said shaft is made of a composite plastic material.

7. The system of claim 1, wherein said shaft is made of Garolite.

8. The system of claim 1, wherein said shaft is made of a fiber epoxy laminate.

9. A system for applying a carbon coating to an interior of a neck portion of a cathode ray tube funnel, said system comprising:
    a first means for spreading said carbon coating in said interior of said neck portion of said cathode ray tube funnel;
    a second means, to which said first means are attached, for pushing said first means through said neck portion of said cathode ray tube funnel; and
    a third means for automatically aligning said cathode ray tube funnel with said first and second means so that said first and second means can be moved through said cathode ray tube funnel, wherein said second means is flexible and made of a non-metallic material so that said second means are not damaged when inserted through a misaligned cathode ray tube funnel.

10. The system of claim 9, further comprising a fourth means for moving said first and second means through said neck portion of said cathode ray tube funnel.

11. The system of claim 9, wherein said second means comprise a Garolite shaft.

12. The system of claim 9, wherein said second means comprise a shaft made of composite plastic material.

13. The system of claim 9, wherein said second means comprise a shaft made of fiber epoxy laminate.

* * * * *